United States Patent [19]
Goto et al.

[11] Patent Number: 5,761,552
[45] Date of Patent: Jun. 2, 1998

[54] CAMERA HAVING SHUTTER INSTRUMENTATION DEVICE FOR MEASURING SHUTTER SPEED

[75] Inventors: Tetsuro Goto, Funabashi; Akira Katayama, Koganei; Masanori Hasuda, Yokohama, all of Japan

[73] Assignee: Nikon Corporation, Tokyo, Japan

[21] Appl. No.: 733,722

[22] Filed: Oct. 16, 1996

Related U.S. Application Data

[63] Continuation of Ser. No. 203,306, Mar. 1, 1994, abandoned.

[30] Foreign Application Priority Data

Mar. 1, 1993 [JP] Japan .................................. 5-062448
Mar. 8, 1993 [JP] Japan .................................. 5-046884

[51] Int. Cl.$^6$ .......................... G03B 7/00; G03B 7/099; G03B 9/40
[52] U.S. Cl. .................. 396/235; 396/273; 396/484
[58] Field of Search .................. 396/268, 269, 396/273, 281, 287, 439, 452, 483, 484, 235, 213; 73/1.56; 250/214 P

[56] References Cited

U.S. PATENT DOCUMENTS 3,913,376 10/1975 Scott ........................................ 73/1.56
3,956,758 5/1976 Numata et al. ........................... 396/290
4,907,027 3/1990 Kobe et al. ............................. 396/235
5,014,082 5/1991 Farrington ............................... 396/235
5,181,063 1/1993 Tagami et al. ........................... 396/235
5,225,865 7/1993 Shiomi et al. ........................... 396/409

Primary Examiner—Safet Metjahic
Assistant Examiner—J. K. Han

[57] ABSTRACT

A camera which can detect the actual opening/closing state of the camera shutter based on a signal reflected towards the shutter by a signal projection unit and received by a signal receiving unit. The signal received by the signal receiving unit is based on the reflectivity of the shutter and, therefore, the signal received by the signal receiving unit is different depending on whether or not the shutter is open or closed. The camera has a reflectivity state detection unit for determining the reflectivity status of the shutter. A reflectivity standard changing unit changes the detection standard of the signal receiving unit based on information output by the reflectivity state detection unit. In this manner, changes in reflectivity of the shutter, due to passage of time or increase in use, will not reduce the accuracy of the detection of the open/close status of the shutter.

11 Claims, 11 Drawing Sheets

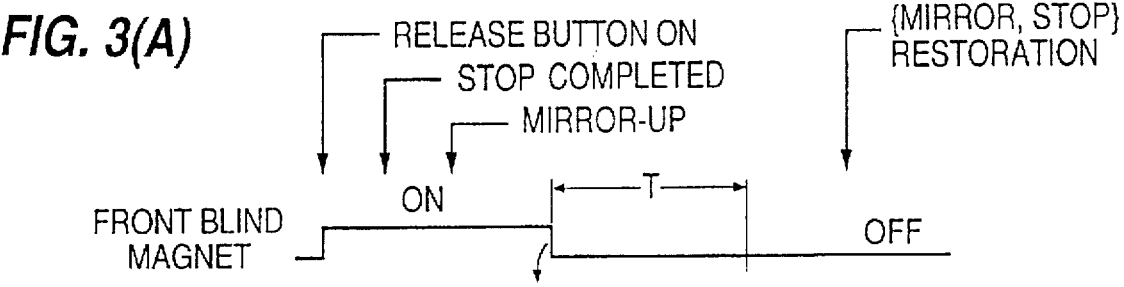
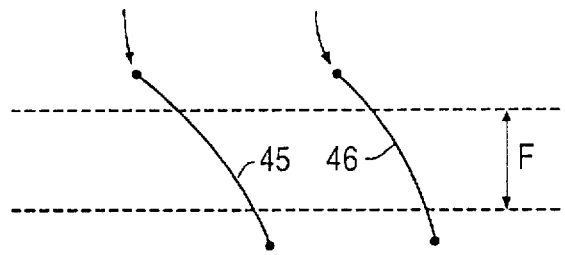
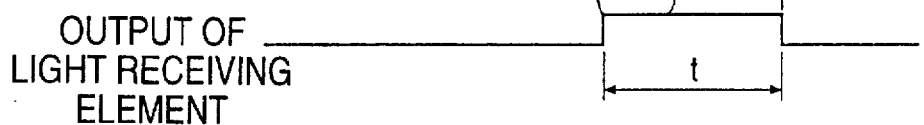
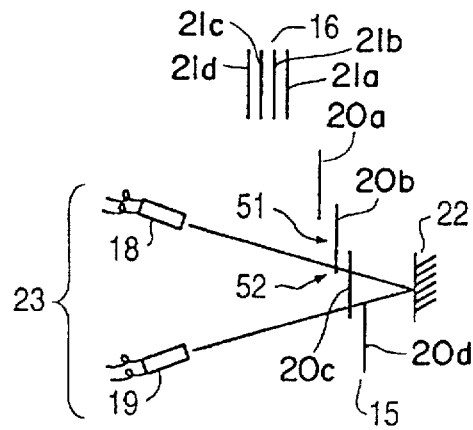

FRONT BLIND MAGNET

REAR BLIND MAGNET

OUTPUT

CAMERA HAVING SHUTTER INSTRUMENTATION DEVICE FOR MEASURING SHUTTER SPEED

This application is a continuation of application No. 08/203,306, filed Mar. 1, 1994, now abandoned.

BACKGROUND OF THE INVENTION

1. Field of the Invention

The present invention relates to a camera and, more particularly, to a camera having a shutter instrumentation device to detect the state of travel of a shutter.

2. Description of the Related Art

In conventional cameras, light beams from a photographic subject passing through a camera aperture are limited by a stop and the time for exposure of the film is limited by a mechanical shutter. A focal plane shutter used in a single lens reflex camera basically comprises two blinds, a front blind and a rear blind. To control film exposure to the light beams from the photographic subject, the front and rear blinds cover the film picture plane so that the film is not exposed.

The front blind initially blocks the aperture, thereby preventing light from reaching the film picture plane. When a photographer presses a release button, the front blind is moved away from the aperture, and exposure of the film picture plane is commenced. After a predetermined time has elapsed, the rear blind moves in a position so that it blocks the aperture and covers the film picture plane. The travel of the front blind and the rear blind is performed mechanically, energized by spring force, and the commencement of travel is performed by releasing a mechanical hold.

Typically, the front and rear blind operations are controlled purely mechanically. However, electrical control has become widely used in recent years. With electrical control, spring force is used to drive the travel of the front blind and the rear blind but the engagement and disengagement of a hold of the front and rear blinds are controlled by passing current to an electromagnet.

Moreover, there is a need to increase the speed of a focal plane shutter. For example, shutter speeds of 1/8,000 second are desirable. In addition, there is a widespread tendency to use strobe, thereby requiring an increase in the synchronized speed of focal plane shutters to allow photography in bright surroundings.

In order to increase the synchronous speed of focal plane shutters, the spring force controlling the front and rear blinds is increased and the front and rear blinds are moved in rapid succession. In addition, by rapidly moving the front and rear blinds, a slit of narrow width is formed. The width of the slit can be controlled by the overlapping motion of the front and rear blinds.

The present invention recognizes that, even with accurate timing of current flow in the electromagnet, the film exposure time cannot be accurately controlled. The actual exposure time depends only on the mechanical travel of the front blind and the rear blind. As displacement elements, there is scatter in the speed of separation of the hold mechanism and the mechanical travel system (which includes a spring). Moreover, these mechanical elements inevitably have varying characteristics due to temperature characteristics or changes with time. These problems become more prevalent when blind travel speeds are increased.

When in an anomalous state, the desired shutter speed is not obtained and the amount of exposure of the film surface becomes insufficient. In extreme cases, the front blind and the rear blind overlap as they travel, with the result that the film is not exposed at all. A converse phenomenon can occur if the blinds do not close, thereby resulting in overexposure.

These problems are especially prevalent in a camera with a shutter having a fast blind speed and narrow slit width.

Also, if any of the above problems occur during photography, the problems cannot be detected until the film is developed. This poses a serious problem since a photographer could continue to take photographs without realizing that the film is not being properly exposed.

SUMMARY OF THE INVENTION

Accordingly, it is an object of the present invention to provide a camera having a stable and accurate shutter instrumentation mechanism which detects the shutter state and shutter speed without contacting the shutter.

It is an additional object of the present invention to provide a camera having a warning indication to the photographer when the shutter speed deviates from required speeds.

It is a further object to provide a camera having a shutter instrumentation device which emits light towards an aperture, detects reflected light to determine whether a shutter blind covers the aperture, and computes the shutter speed based on the detected shutter blind state.

It is a still further object of the present invention to provide a camera having a mechanism for detecting changes in the reflectivity of a shutter blind and compensate for these changes so that erroneous detection results can be avoided.

Additional objects and advantages of the invention will be set forth in part in the description which follows and, in part, will be obvious from the description, or may be learned by practice of the invention.

The foregoing objects of the present invention are achieved by providing a camera comprising a shutter mechanism for opening and closing an aperture to expose film. The shutter mechanism comprises a front blind having a slit forming vane and a rear blind having a slit forming vane. A control unit controls the movement of the shutter mechanism so that, to expose the film, the front blind and the rear blind form a slit through cooperation between the slit forming vanes. A detection mechanism detects the actual state of travel of the slit forming vanes.

The objects of the present invention are also achieved by providing a camera comprising a shutter mechanism for opening and closing an aperture, wherein the shutter mechanism has a reflectivity status indicating the reflectivity of the shutter mechanism. A signal projection unit transmits a signal towards the shutter mechanism. A signal receiving unit, positioned to receive reflected signals transmitted by the signal projection unit and reflected off the shutter mechanism, receives the reflected signals and provides a related output. The signal receiving unit has a detection standard for detecting the received signals. A shutter instrumentation unit measures, based on the output of the signal receiving unit, the actual time for the shutter mechanism to open and close the aperture. A reflectivity state detection unit determines the reflectivity status of the shutter mechanism and outputs information relating to the reflectivity status. A reflectivity standard changing unit, receiving the information output by the reflectivity state detection unit, changes the detection standard of the signal receiving unit based on the information output by the reflectivity state detection unit.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 3(A), 3(B), 3(C) and 3(D) are timing charts illustrating the operation of a shutter instrumentation device for a camera according to an embodiment of the present invention.

FIG. 4 is a diagram showing a cross section of a shutter instrumentation device for a camera according to an embodiment of the present invention.

DESCRIPTION OF THE PREFERRED EMBODIMENTS

Figure 1:
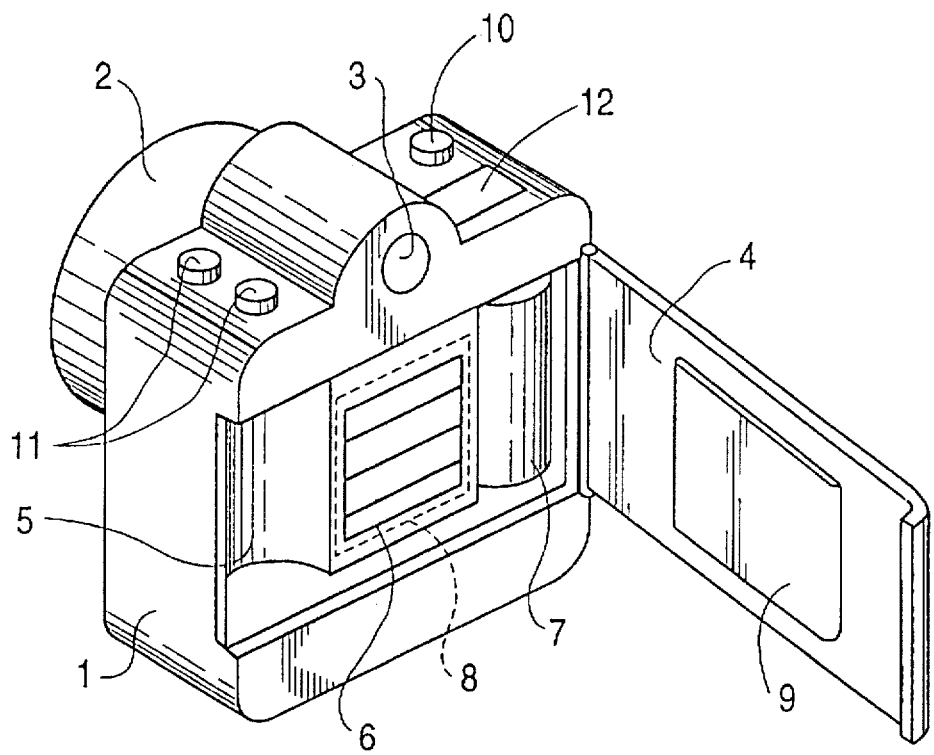
FIG. 1 is an oblique view of a camera having a shutter instrumentation device according to an embodiment of the present invention.

Reference will now be made in detail to the present preferred embodiments of the present invention, examples of which are illustrated in the accompanying drawings, wherein like reference numerals refer to like elements throughout.

FIG. 1 is an oblique view illustrating a configuration of camera 1 having an instrumentation device according to an embodiment of the present invention. In FIG. 1, back cover 4 is open, a film cartridge (not illustrated) is loaded into cartridge compartment 5, and film withdrawn from the film cartridge passes across the front face of aperture 6 to be wound on spool 7. Pressure plate 9, located on the inside of back cover 4, operates to press the film and keep it flat against aperture 6. Shutter 8, slightly wider than aperture 6 and located on the inside of aperture 6, is illustrated by a broken line. By the movement of shutter 8, light from a subject (not illustrated) passes via lens 2 to the film picture plane for a predetermined time.

A photographer (not illustrated) observes the subject through lens 2 via viewfinder 3. Exposure begins when the photographer presses release button 10. An exposure mode and various conditions can be displayed on display device 12. Display device 12 includes a liquid crystal or a similar electro-optical element. Plural setting buttons 11 are operating buttons which change the operating mode and photographic conditions of camera 1. Plural setting buttons 11 are operated while confirming camera status displayed on display device 12.

Figure 2:
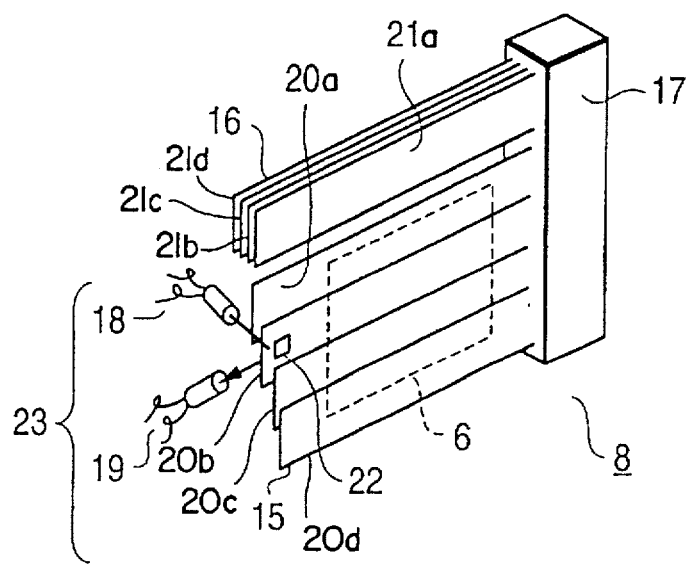
FIG. 2 is an oblique view showing a shutter instrumentation device for a camera according to an embodiment of the present invention.

FIG. 2 is an oblique view showing shutter 8 of camera 1 of an embodiment of the present invention and is intended to illustrate relative positions of shutter 8 and aperture 6. FIG. 2 shows the shutter state before release button 10 is pressed (that is, before the commencement of exposure). Aperture 6, represented by a broken line, is covered by front blind 15. Front blind 15 generally includes plural shutter blind 15. In the present embodiment of the present invention, front blind 15 comprises four shutter vanes 20a–20d. In the shutter state illustrated in FIG. 2, front blind 15 is extended to cover aperture 6. When front blind 15 is extended, shutter vanes 20a–20d of front blind 15 are slightly overlapping. The foremost shutter vane 20a in front blind 15 is a slit forming shutter vane.

As shown in FIG. 2, shutter 8 comprises two blinds: front blind 15 and rear blind 16. Rear blind 16 comprises four shutter vanes 21a–21d. Front blind 15 and rear blind 16 are in a spaced relationship. When either front blind 15 or rear blind 16 is "folded," the respective blind does not cover aperture 6. When either front blind 15 or rear blind 16 is in an extended position, the respective blind either totally covers aperture 6 or partially covers aperture 6. Therefore, when either front blind 15 or rear blind 16 is totally extended, aperture 6 is "closed" and the film is not exposed. When both front blind 15 and rear blind 16 are completely folded, aperture 6 is "open" and the film is exposed.

In FIG. 2, rear blind 16 is shown folded in an "upwards direction." To cover aperture 6, rear blind 16 extends "downwards." Front blind 15 is shown in an extended state, covering aperture 6. To open aperture 6, front blind 15 folds "downward." Therefore, the exposure of film through aperture 6 can be controlled by controlling the movement of front blind 15 and rear blind 16. For example, front blind 15 and rear blind 16 can be controlled so that front blind 15 is in a partially extended state, in the process of being folded downwards while, at the same time, rear blind 16 is partially folded and in the process of being extended. In this manner, a "slit" can be formed between front blind 15 and rear blind 16.

Formation of a slit between front blind 15 and rear blind 16 provides for a relatively high shutter speed. The following is a more detailed description of the movement of front blind 15 and rear blind 16 to form a slit. Front blind 15 travels until it reaches the middle of aperture 6. At this time, rear blind 16 is in a "folded" state. Rear blind 16 comprises plural shutter vanes 21a–21d which, in the shutter state illustrated in FIG. 2, are superposed in a folded "waiting" position upwards from aperture 6. The foremost shutter vane 21a in rear blind 16 is a slit forming shutter vane which cooperates with the front blind slit forming shutter vane 20a to form a slit. By controlling the movement of rear blind 16 in relation to front blind 15, an appropriate slit can be formed. Shutter speed and exposure time are controlled by the width and duration of the slit.

Shutter control mechanism 17 includes the front blind magnet (not illustrated) and the rear blind magnet (not illustrated). In addition, shutter control mechanism 17 accommodates springs used to control the travel of front blind 15 and rear blind 16. The front blind and rear blind magnets individually hold front blind 15 and rear blind 16, respectively. There are well-known mechanisms, such as spring systems, which cause front blind 15 and rear blind 16 to travel. Well-known mechanisms (for example, see linkage members 70 in FIGS. 10(A), 10(B) and 10(C)) move each shutter vane 20a–20d of front blind 15 and each shutter vane 21a–21d of rear blind 16 in a parallel, up and down direction.

The action of exposure from the shutter state illustrated in FIG. 2 is performed as follows. First, the front blind magnet (not illustrated) releases front blind 15. In this manner, front blind 15 moves downwards (in a downward direction in FIG. 2) from aperture 6, and folds up. At this time, slit forming shutter vane 20a is the last shutter vane to move away. Therefore, aperture 6 is no longer obstructed and the film is exposed to light from the subject. After a further predetermined time, a rear blind magnet (not illustrated) releases rear blind 16, which causes the rear blind 16 to move downwards from the position shown in FIG. 2. Therefore, rear blind 16 covers aperture 6 by extending over aperture 6. Exposure is completed once rear blind 16 covers aperture 6. The exposure time is predetermined.

After the exposure has been performed in the above manner, the film is advanced one frame by a windup mechanism (not illustrated), and a new, unexposed portion of film is positioned to correspond with aperture 6. Before the next exposure, front blind 15 is returned to an initial position in which front blind 15 is extended to cover aperture 16 and rear blind 16 is returned to a folded position, upwards of aperture 6.

Detection mechanism 23 detects the status of shutter 8 (which includes front blind 15 and rear blind 16). Detection mechanism 23 includes LED 18 and light receiving element 19 and is arranged to closely correspond to the front end of each shutter vane 20a–20d of front blind 15 and each shutter vane 21a–21d of rear blind 16. Furthermore, mirror 22 (or a similar type reflecting member) is fixed on a different side of shutter 8 than detection mechanism 23, with front blind 15 and rear blind 16 inserted between detection mechanism 23 and mirror 22. LED 18 projects light towards shutter 8. When aperture 6 is covered by front blind 15 or rear blind 16, the light projected from LED 18 is reflected from front blind 15 or rear blind 16, respectfully, and detected by light receiving element 19. When aperture 6 is not covered by either front blind 15 or rear blind 16, light projected from LED 18 is reflected from mirror 22. The light reflected from mirror 22 is then detected by light receiving element 19. If the reflectivity of front blind 15 and rear blind 16 is arranged to be different from the reflectivity of mirror 22, then the state of shutter 8 can be determined by analyzing the output of light receiving element 19.

Front blind 15 and rear blind 16 are matted with a black color. Therefore, when the front blind 15 or rear blind 16 covers aperture 6, light transmitted by LED 18 towards front blind 15 or rear blind 16 is scarcely reflected and, therefore, is not incident on light receiving element 19. In contrast, when front blind 15 or rear blind 16 do not cover aperture 6 (that is, during exposure), light transmitted by LED is reflected by mirror 22. The reflectivity of mirror 22 is relatively high compared to the reflectivity of front blind 15 or rear blind 16. Light reflected from mirror 22 is incident on light receiving element 19.

Accordingly, by analyzing the output of light receiving element 19, it is possible to determine the actual times at which front blind 15 or rear blind 16 open/close and, therefore, the actual exposure time can be determined.

FIGS. 3(A), 3(B), 3(C) and 3(D) are timing charts showing the relationship of front blind 15 and rear blind 16. The relationship is shown between the travel states of front blind 15 and rear blind 16 and the corresponding changes in the output signal of light receiving element 19. Commencement of travel of front blind 15 and rear blind 16 is affected by changing the ON/OFF status of the front blind magnet or the rear blind magnet, respectively. When release button 10 is pressed, the flow of current to the front and rear blind magnets is set ON, and the front blind 15 and rear blind 16 are held in position by an electrical "hold" of the front blind magnet and the rear blind magnet, respectively. Before release button 10 is pressed, front blind 15 and rear blind 16 are held by well-known mechanical devices. When release button 10 is pressed, there is a changeover from the mechanical hold to electrical hold by the front and rear blind magnets.

After this changeover, stop control of lens 2 is performed, and a mirror (not illustrated) in the photographic optical path is raised as is known.

Next, the front blind magnet is set OFF, causing front blind 15 to move according to travel curve 45 (see FIG. 3(C)). In FIG. 3(C), region F, shown by broken lines, denotes the vertical extent of aperture 6. The travel of front blind 15 is such that the travel curve 45 describes a circular arcuate locus in region F. During the travel of front blind 15, slit forming shutter vane 20a of front blind 15 passes across the front surface of detection mechanism 23 and, therefore, the output of light receiving element 19 reverses (at output change 47 in FIG. 3(D)). After control time T (which is the predetermined exposure time) has elapsed, the rear blind magnet is set OFF. Setting the rear blind magnet OFF causes rear blind 16 to traverse region F along travel curve 46. At this time, rear blind 16 passes across the front surface of detection mechanism 23, and the output of light receiving element 19 reverses (at output change 48 in FIG. 3(D)). Front blind 15 and rear blind 16 then return to the initial state.

If output changes 47 and 48 are timed, combined with the timing of the front blind and rear blind magnet action, the true exposure time t can be determined. For example, an exposure control circuit (not illustrated) determines the proper control time T and causes the front and rear blind magnets to be driven with the correct timing. When the true exposure time t of pulse S obtained from light receiving element 19 is markedly different from the control time T, an erroneous action of the mechanical system occurred.

FIG. 4 is a cross sectional view showing the positional relationship of front blind 15, rear blind 16, detection mechanism 23 and mirror 22.

Before the travel of front blind 15, front blind 15 covers aperture 6 and light emitted by LED 18 is absorbed by the low reflective surface of front blind 15. Therefore, light incident on front blind 15 does not reach light receiving element 19. When front blind 15 commences its travel, aperture 6 is open and the light emitted by LED 18 is reflected by mirror 22 to light receiving element 19.

In the above-described embodiment of the present invention, the state of reflection of light from LED 18 projected onto front blind 15 or rear blind 16 is detected by light receiving element 19 to determine the presence or absence of either front blind 15 or rear blind 16. Shutter speed is determined from the pulse width of the output of light receiving element 19. This method of shutter state and shutter speed detection provides a method which does not require contact with shutter 8. This method is a relatively stable and inexpensive shutter state and shutter speed method.

A problem can occur in that the high speed folding of front blind 15 and rear blind 16 can cause a scratching of the surface of individual shutter vanes 20a–20d and 21a–21d, thereby increasing the reflectivity of shutter vanes 20a–20d and 21 a–21d. This increased reflectivity can lead to erroneous detection of the shutter state. For example, front blind 15 includes shutter vanes 20a and 20b. During the travel of front blind 15, shutter vane 20a rubs against shutter vane 20b at high speed. As a result, the reflectivity of the front surface 51 of shutter vane 20b increases. In particular, end surface 52 of a coating film of shutter vane 20b becomes marked or scratched in comparison with other portions of shutter vane 20b and, as a result, shutter vane 20b reflects light. This effect can occur for other shutter vanes in front blind 15 or rear blind 16.

In FIG. 4, front blind 15 is closed (that is, front blind 15 covers aperture 6) and the light from LED 18 is reflected by front surface 51 or end surface 52 of shutter vane 20b. Due to marking or scratching of front surface 51 or end surface 52, the light is reflected to light receiving element 19. In an embodiment of the present invention, when the amount of light reflected to light receiving element 19 exceeds a given fixed value, a processing circuit (discussed below) recognizes an error in the detection of the shutter state.

Figure 5:
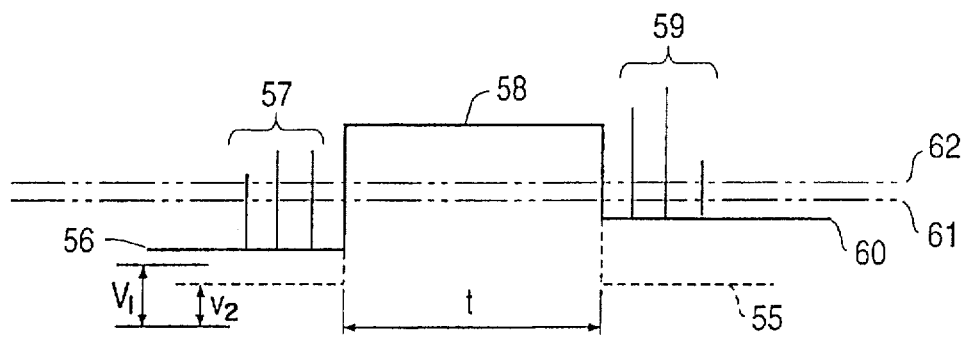
FIG. 5 is a timing chart to illustrate the operation of a shutter instrumentation device for a camera according to an embodiment of the present invention.

FIG. 5 is a timing chart illustrating changes in the output signal of light receiving element 19. With shutter vanes of sufficiently low reflectivity, broken line 55 combined with flat portion 58 represent the output of light receiving element 19 from a time when front blind 15 and rear blind 16 are in their initial states (front blind 15 covering aperture 6 and rear blind folded upward of aperture 6) through exposure. Two-dot chain line 61 represents a threshold value for a processing circuit to determine whether or not there is a significant signal. The use of a threshold value acts as a counter-force against noise.

However, when front blind 15 and rear blind 16 have been used a significant number of times, the reflectivity of the shutter vanes increases. This increase in reflectivity in front blind 15 can cause an increase in the minimum voltage (previously represented by broken line 55) to voltage 56 or the generation of voltage spikes 57. An increase in reflectivity in rear blind 16 can cause an increase in the minimum voltage to voltage 60 or the generation of voltage spikes 59. Voltage spikes 57 and 59 are generated by the increase of reflectivity of end surface 52 of shutter vanes 20a–20d on front blind 15 or shutter vanes 21a–21d on rear blind, respectively. Flat portion 58, which represents the highest voltage output by light receiving element 19, results only from the high reflectivity of mirror 22. Since the reflectivity of mirror 22 does not change from an initial state (mirror 22 does not undergo the scratching or rubbing process that shutter vanes endure), flat portion 58 is not changed by changes in reflectivity of front blind 15 or rear blind 16.

In order to perform accurate measurement for the above changes in output of light receiving element 19, the threshold voltage of the processing circuit is increased from the two-dot chain line 61 to the two-dot chain line 62. In this manner, a counter-force against noise is still maintained. Time constant circuit 40 (see FIG. 6) is used to reduce the effect of voltage spikes 57 and 59. The signal from light receiving element 19 is input to time constant circuit 40 and the output of the time constant circuit is input to the processing circuit. Such time constant circuits are well-known in the art. In a preferred embodiment of the present invention, the time constant circuit is a low pass filter for allowing the t-duration pulse S to pass therethrough, while cutting off voltage spikes 57 and 59.

Figure 6:
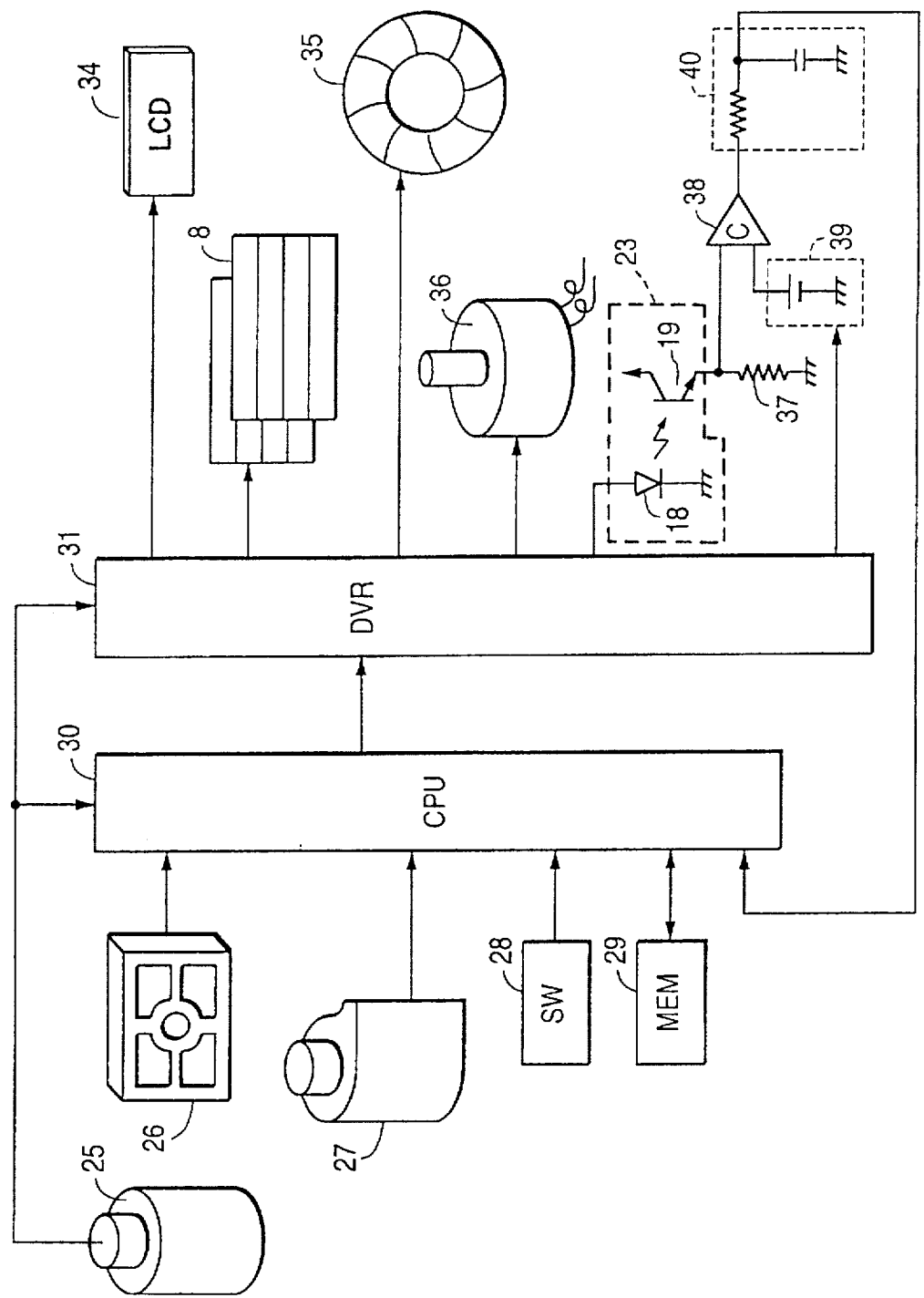
FIG. 6 is a block diagram showing of an overall configuration of a camera having a shutter instrumentation device according to an embodiment of the present invention.

FIG. 6 is a block diagram of a camera to control the above operations, according to an embodiment of the present invention.

Battery 25 is a power source for all circuit components. CPU 30 provides central control of all operations. Photometric device 26 is a well-known sensor device, comprising photodiodes, which measures the luminosity of a subject. Photometric device 26 divides this luminosity into plural portions representing various areas of the subject and supplies plural photometric value information to CPU 30. Film sensitivity detection device 27 reads code signals provided on the side surface of a loaded film cartridge and inputs film sensitivity information to CPU 30.

Switch (SW) group 28 includes manual operation switches (not illustrated) connected to release button 10 and setting buttons 11, in addition to timing switches (not illustrated) for the detection of timing sequences of camera operation. Information on the camera state is input to CPU 30 from switch group 28. Memory circuit (MEM) 29, comprising a non-volatile semiconductor memory, stores the number of times that shutter 8 is operated.

Outputs from CPU 30 carry out the following operations through driver device (DVR) 31. LCD 34, disposed in display device 12, is driven to display information relating to the exposure, operating mode, warning information, and other photographic information. Shutter 8 (comprising front blind 15 and rear blind 16) is driven so that the operating time interval of the front blind magnet (not illustrated) and rear blind magnet (not illustrated) are controlled, based on a calculated exposure time T. The amount of light passing through shutter 8 is controlled by driving stop 35 in lens 2. Film forwarding, winding and rewinding are controlled by driving motor 36. CPU 30 also controls, through driver device 31, the urging action of springs (not illustrated) for driving front blind 15 and rear blind 16.

Detection mechanism 23, comprising LED 18 and light receiving element 19, is also controlled by CPU 30 through driver device 31. LED 18 is lighted during the time necessary for a measurement of shutter operation. The light received by light receiving element 19 is converted by light receiving element 19 into an output signal having pulse S (see FIG. 3(D)). The output signal is input to comparator (C) 38. Comparator 38 compares the output of light receiving element 19 and the output of variable reference voltage source 39 and transmits an output to time constant circuit 40. Variable reference voltage source 39 is controlled by CPU 30 through driver device 31. CPU 30 receives the signal via time constant circuit 40 and uses this signal to perform shutter timing. Resistor 37 provides for proper biasing of light receiving element 19 and comparator 38.

Variable reference voltage source 39 obtains a threshold voltage from the appropriate two-dot chain lines 61 or 62. The time constant circuit 40 is designed to absorb voltage spikes 57 and 59. Moreover, time constant circuit 40 is also used to eliminate high frequency noise.

Figure 7:
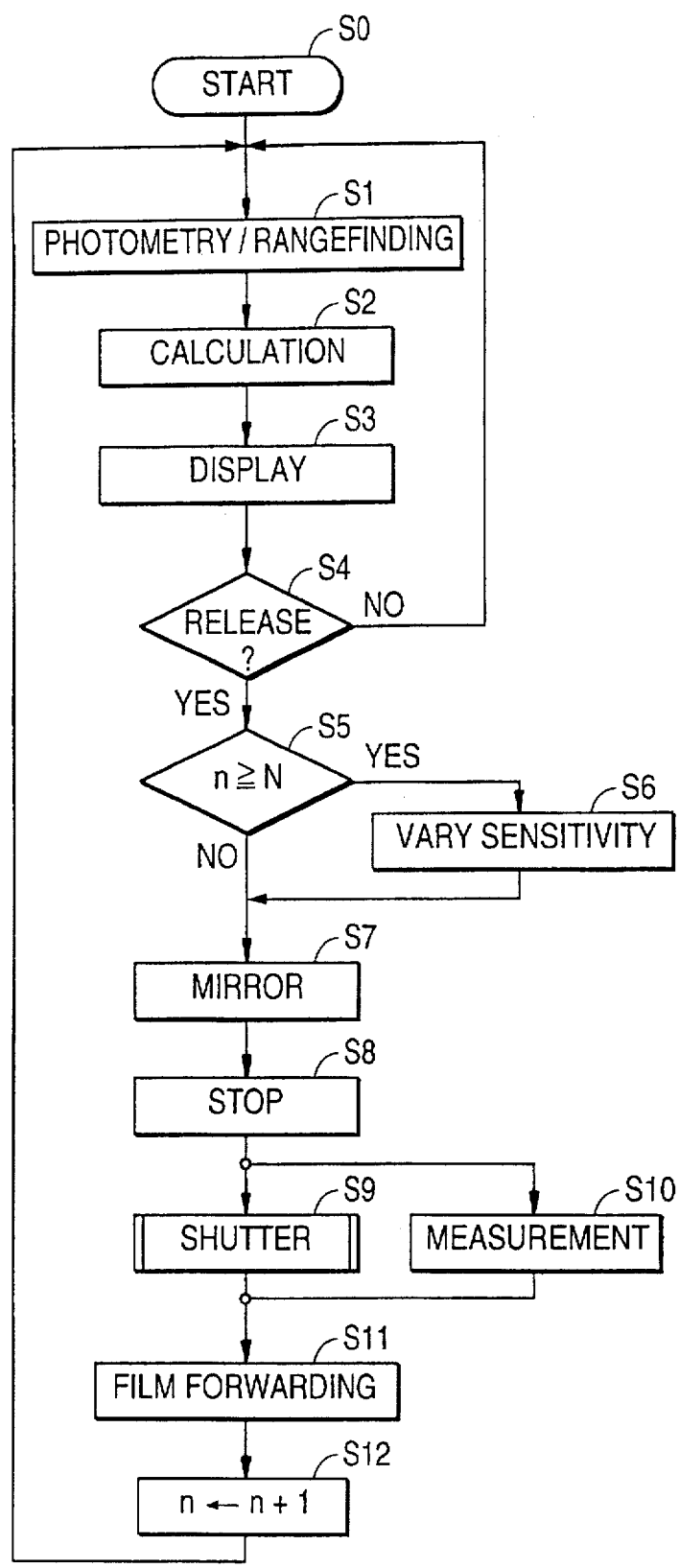
FIG. 7 is a flow chart illustrating a processing sequence of the overall operations of a camera having a shutter instrumentation device according to an embodiment of the present invention.

FIG. 7 is a flow chart illustrating a processing sequence for CPU 30 in an embodiment of the present invention. The processing sequence of FIG. 7 is repeatedly performed while power is being supplied by battery 25.

The process starts from step S0. In step S1, photometric information and sensitivity information are input to CPU 30 from photometric device 26 and film sensitivity detection device 27, respectively. In step S2, based on the photometric information and sensitivity information obtained in step S1, the appropriate exposure conditions of shutter speed and stop value are calculated. The shutter speed found in step S2 represents control time T. In step S3, exposure conditions found above (in step S2) are displayed on LCD 34.

In step S4, it is determined via switch group 28 whether or not release button 10 has been pressed. If release button 10 has not been pressed, the process returns to step S1.

In step S5, the number n of times that shutter 8 has been operated (which is stored in memory circuit 29) is read out and compared with a predetermined limiting number N. The number n of times the shutter 8 has been operated is a numerical value that is increased each time shutter 8 is operated. The limiting number N is the estimated number of times of shutter operation until the change of reflectivity of the shutter vanes causes errors in measurement. If the number n of shutter operation times exceeds the limiting number N, the process proceeds to step S6. If n does not exceed N, the process moves to step S7.

In step S6, variable reference voltage source 39 is varied via driver device 31, thereby causing the sensitivity of comparator 38 to change.

In step S7, a reflecting mirror (not illustrated) is raised and moved out of the photographic light path.

In step S8, stop 35 is controlled to the predetermined stop aperture found in step S2.

Steps S9 and S10 are processed simultaneously. In step S9, shutter 8 is opened and closed to expose the film based on the exposure control time T found in step S2. In step S10, the measurement of the opening and closing of shutter 8 is determined by detection mechanism 23. The measurement time t of pulse S found here (step S10) is later compared with control time T. If t is markedly different from control time T, a warning display may be performed on LCD 34.

In step S11, the operation of exposure has been completed, therefore, motor 36 is rotated to forward the film. In addition, the action of re-energization of the front blind and rear blind springs residing in shutter control mechanism 17 is performed.

In step S12, the number n of times of shutter operation is incremented by one, and the new number n of times of shutter operation is stored in memory circuit 29.

At this point, the exposure operation has run its course and the processing sequence returns to step S1.

In the above embodiment of the present invention, the determination of the number of times that shutter 8 has been operated has been described as cut off at a single value, N. However, optimization may be effected by providing plural values whereby the sensitivity of comparator 38 can be adjusted either in stages or continuously.

In an embodiment of the present invention, a process of sensitivity optimization is illustrated in which a reference voltage source of a comparator is varied. However, the present invention is not limited to varying a comparator, and variable gain circuits and similar elements may be used.

If the output of light receiving element 19 is not digitized in comparator 38, the output of light receiving element 19 can be input directly to an AD converter port (not illustrated) of CPU 30 and time t may be found in CPU 30. In this case, measurement of time t can be carried out by variation of sensitivity, variation of decision level, etc.

Moreover, in step S5 of FIG. 7, the decision of the surface state of the shutter is described in relation to a comparison ($n \geq N$) of the number n of times of shutter operation and the limiting number N of times of shutter operation. When n becomes greater than N, the sensitivity of detecting mechanism 23 is varied.

However, as illustrated in FIG. 5, another embodiment of the present invention could use a threshold voltage $v_1$, corresponding to the initial surface reflectivity of the shutter vanes 20a–20d and 21a–21d of front and rear blinds 15 and 16, respectively. Voltage $v_2$ corresponds to the surface reflectivity after the passage of time. Voltage $v_2$ could then be compared to the threshold voltage $v_1$. If $v_2$ is greater than or equal to $v_1$, then the sensitivity of detection mechanism 23 is varied.

Figure 8:
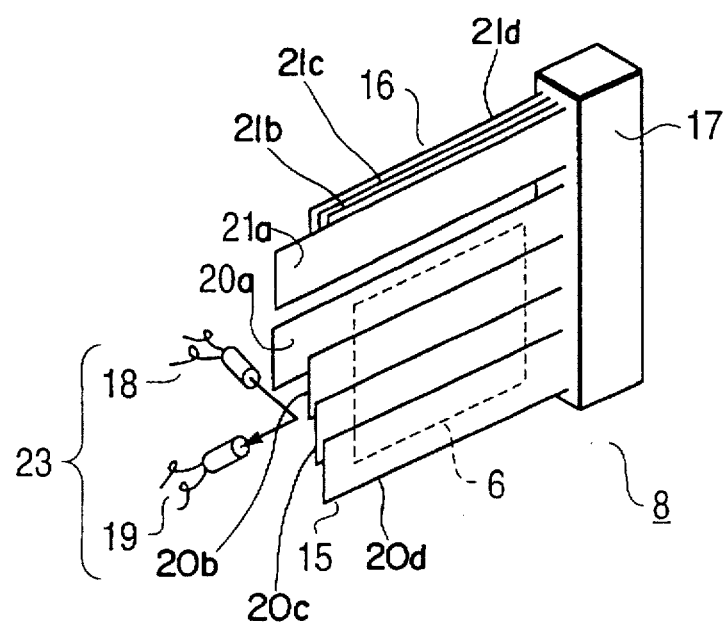
FIG. 8 is an oblique view showing a shutter instrumentation device for a camera according to an embodiment of the present invention.

FIG. 8 shows the positional relationship of front blind 15, rear blind 16 and aperture 6 in a further embodiment of the present invention.

Referring now to FIG. 8, front blind 15 is comprised by shutter vanes 20a–20d and rear blind 16 is comprised by shutter vanes 21a–21d. Aperture 6 is covered by front blind 15 before release button 10 is pressed. When front blind 15 covers aperture 6, front blind 15 is extended with small overlap portions. In FIG. 8, rear blind 16 is folded up above aperture 6. Shutter vane 20a of front blind 15 and shutter vane 21a of rear blind 16 are considered to be slit forming shutter vanes, respectively. Shutter vanes 20a and 21a mutually cooperate to form a slit. Each slit forming shutter vane 20a and 21a is slightly longer in the horizontal dimension than the other shutter vanes.

From the position illustrated in FIG. 8, front blind magnet (not illustrated) releases front blind 15. Therefore, front blind 15 moves away, folding from aperture 6. When front blind 15 moves away from aperture 6, the light from a subject is not obstructed and the film is exposed. After a predetermined time has elapsed, the rear blind magnet (not illustrated) releases rear blind 16 and rear blind 16 moves from the position shown in FIG. 8 to spread downwards over aperture 6. Aperture 6 is now covered by rear blind 16 and the predetermined exposure time is complete.

After the exposure is performed, the film is wound one frame and a new, unexposed portion of film faces aperture 6. In addition, front blind 15 and rear blind 16 are pulled back to their initial state (that is, front blind 15 covers aperture 6 and rear blind 16 is folded up) before the exposure of the new portion of film.

As shown in FIG. 8, LED 18 and light receiving element 19 (included in detection mechanism 23) act to detect the state of front blind 15 and rear blind 16. LED 18 and light receiving element 19 are adjacently located, facing the front ends of slit forming shutter vanes 20a and 21a. In this embodiment of the present invention, detection mechanism 23 detects only the travel state of slit forming shutter vanes 20a and 21a. The travel state of other shutter vanes is not detected.

LED 18 and light receiving element 19 are located such that light from LED 18 reflected by slit forming shutter vane 20a of front blind 15 or slit forming shutter vane 21a of rear blind 16 is incident on light receiving element 19. Therefore, slit forming shutter vanes 20a and 21a are in the light path of LED 18. When slit forming shutter vanes 20a and 21a are not in the light path of LED 18, the light emitted from LED 18 is not incident on light receiving element 19. In this manner, it is possible to detect the timing relationship of each slit forming shutter vane 20a and 21a.

In summary, front blind 16 or rear blind 15 travels across aperture 6. When the front end of the respective slit forming shutter vanes 20a and 21a are in a state obstructing the light path of LED 18, the output of light receiving element 19 reverses. Therefore, it is possible to analyze the movement of front blind 15 and rear blind 16 by measuring the timing interval of output reversals of light receiving element 19.

Figure 9:
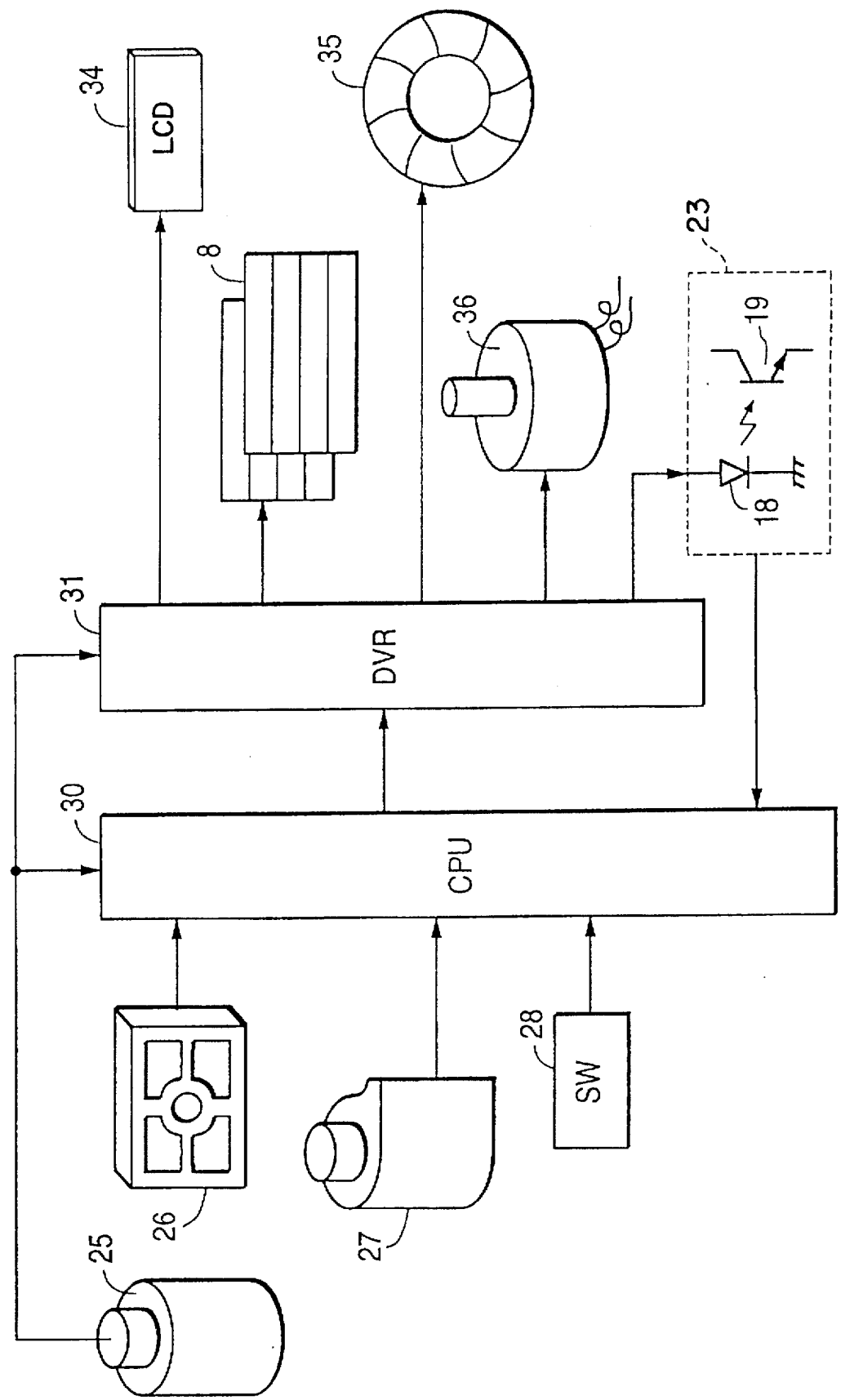
FIG. 9 is a block diagram showing an overall configuration of a camera having a shutter instrumentation device according to an embodiment of the present invention.

FIG. 9 illustrates a simplified block diagram of the camera system illustrated in FIG. 6. Components illustrated in FIG. 9 have been previously discussed in relation to FIG. 6 and, therefore, a repeat discussion will be omitted.

Figure 10A:
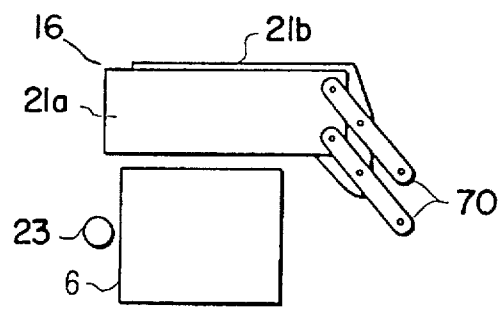
FIGS. 10(A), 10(B) and 10(C) are diagrams illustrating the movement of a shutter blind for a camera according to an embodiment of the present invention.
Figure 10B:
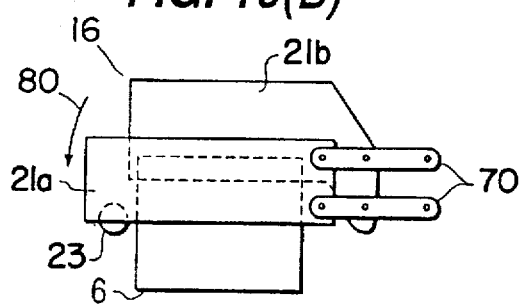
Figure 10C:
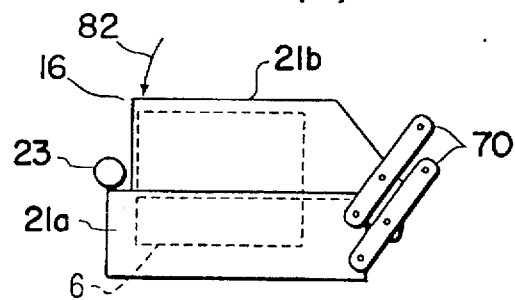

FIGS. 10(A), 10(B) and 10(C) illustrate in detail the positional relationship of slit forming shutter vane 21a and the other shutter vanes in relation to detection mechanism 23.

To simplify the description, rear blind 16 is constituted by two shutter vanes: shutter vane 21a is a slit forming shutter vane and shutter vane 21b is a "normal" shutter vane. Two linkage members 70 move each shutter vane up and down. Linkage members 70 are located in shutter control mechanism 17.

FIG. 10(A) is a diagram showing the state of rear blind 16 during an exposure. The travel of front blind 15 (not illustrated in FIGS. 10(A), 10(B) or 10(C)), is complete. Therefore, light from the subject is projected through aperture 6. Accordingly, detection mechanism 23 detects that neither front blind 15 nor rear blind 16 are present.

FIG. 10(B) is a diagram showing the state of rear blind 16 when exposure is ending. By the operation of linkage members 70, only the slit forming shutter vane 21a descends. Shutter vane 21a descends in a circular arcuate locus as shown by arrow 80. At this time, because the front end of shutter vane 21a passes across and covers the front surface of detection mechanism 23, detection mechanism 23 detects that rear blind 16 is present. At this time, shutter vane 21b also begins to descend and cover the upper portion of aperture 6.

FIG. 10(C) is a diagram showing the state of rear blind 16 after the exposure is completed. The descent of shutter vane 21a has ended, and shutter vane 21b descends in a circular arcuate locus (as shown by arrow 82) to completely cover aperture 6.

Since slit forming shutter vanes 20a and 21a are slightly longer in the horizontal direction than normal shutter vanes (as illustrated in FIGS. 8, 10(A), 10(B) and 10(C)), only the slit forming shutter vane 21a passes across the front surface of detection mechanism 23 in FIGS. 10(B) and 10(C).

As can be seen from FIGS. 10(A), 10(B) and 10(C), shutter vane 21a has a travel distance which is generally longer than that of a normal shutter vane. Therefore, shutter vane 21a has the largest circular travel arc (in relation to other shutter vanes). If detection mechanism 23 is located close to the side portion of aperture 6, the length of each shutter vane 21a and 20a can be the same as normal shutter vanes (such as shutter vane 21b). In this manner, a minimum shutter vane length can be maintained and the weight of shutter 8 (comprising front blind 15 and rear blind 16) can be minimized.

Figure 11:
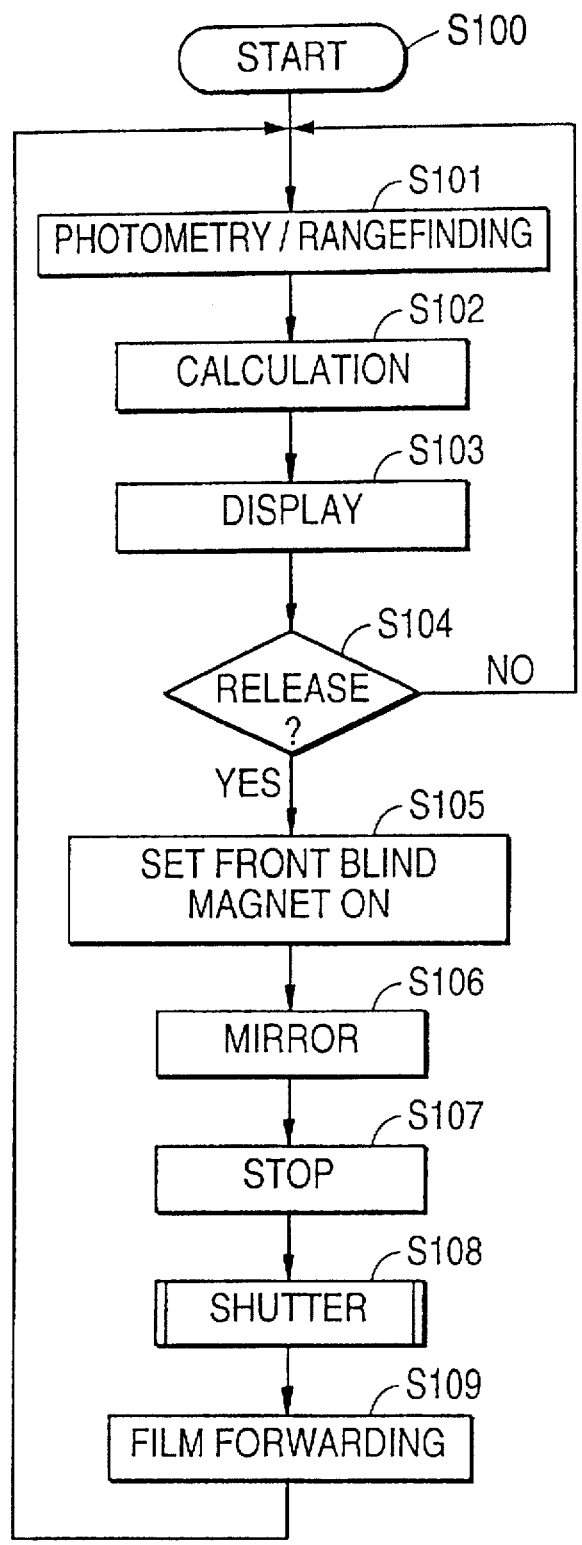
FIG. 11 is a flow chart of an overall processing sequence of a camera having a shutter instrumentation device according to an embodiment of the present invention.

FIG. 11 illustrates an overall processing sequence of CPU 30 in an embodiment of the present invention. This processing sequence is repeatedly performed while power is supplied by battery 25.

The process starts from step S100. In step S101, photometric signals and sensitivity signals are input to CPU 30 from photometric device 26 and film sensitivity detection device 27, respectively. In step S102, the appropriate exposure conditions of shutter time and stop value are calculated and stored in memory. In step S103, the exposure conditions found in step S102 are displayed on LCD 34. In step S104, it is determined, via switch group 28, whether or not release button 10 has been pressed. If release button 10 has not been pressed, the processing sequence returns to step S101.

In step S105, since release button 10 has been pressed, the front blind and rear blind magnets are respectively set ON. In step S106, a reflecting mirror (not illustrated) is raised and moved out of the photographic light path. In step S107, stop 35 is controlled to be a predetermined stop aperture. In step S108, shutter processing is executed to control the opening of shutter 8 (comprising front blind 15 and rear blind 16) and exposure of the film. In step S108, the shutter state is detected via detection mechanism 23.

In step S109, the operation of exposure has been completed so motor 36 is rotated and the film is forwarded. In addition, each element of camera 1 is returned to an initial position. For example, front blind 15 and rear blind 16 are returned to their initial positions and photographic modes are returned to initial conditions. Since the exposure process has thereby run its course, the processing sequence returns to step S101 and the above-mentioned process is repeated.

Figure 12:
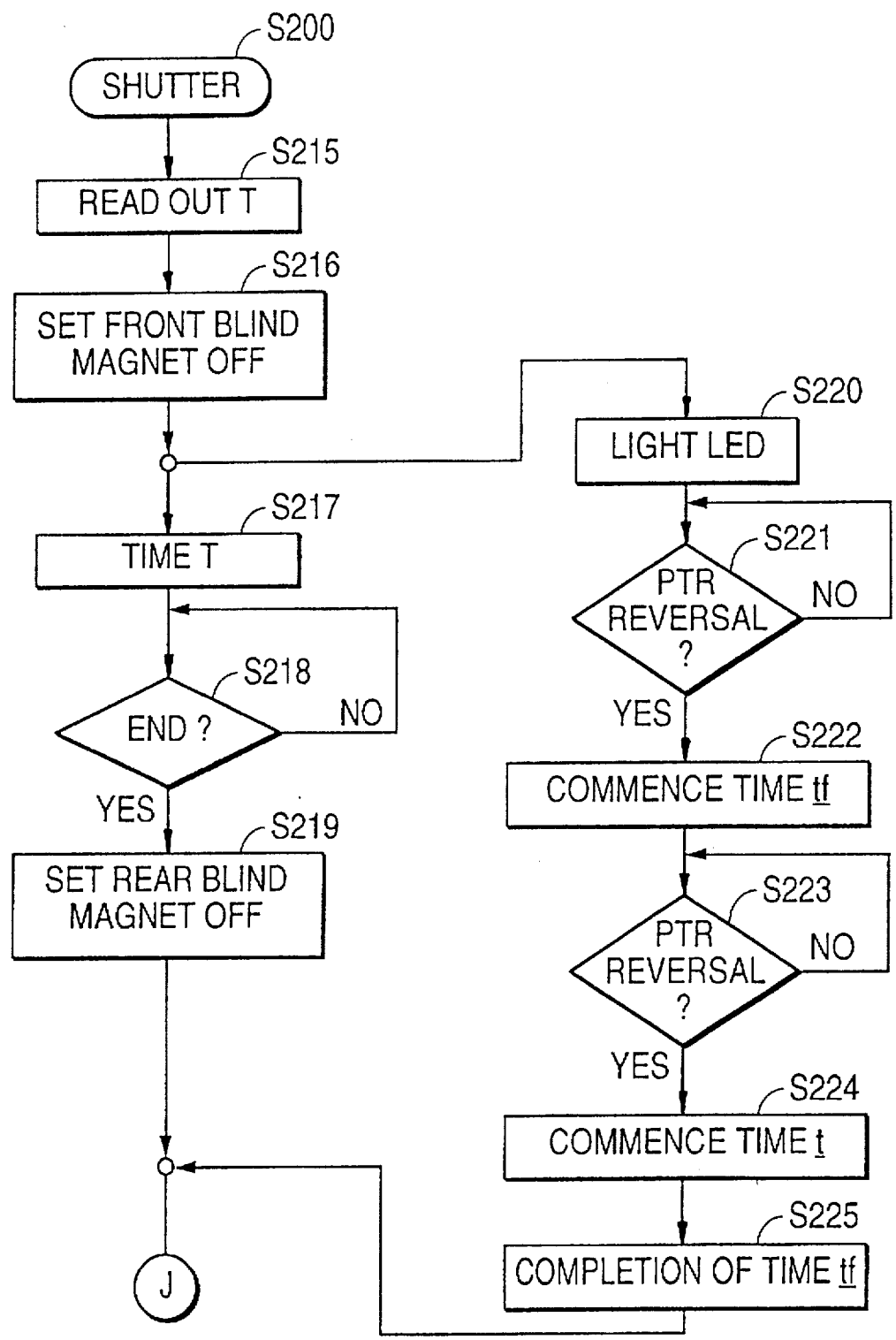
FIGS. 12 and 13 are flow charts illustrating a processing sequence of a shutter control for a camera having a shutter instrumentation device according to an embodiment of the present invention.
Figure 13:
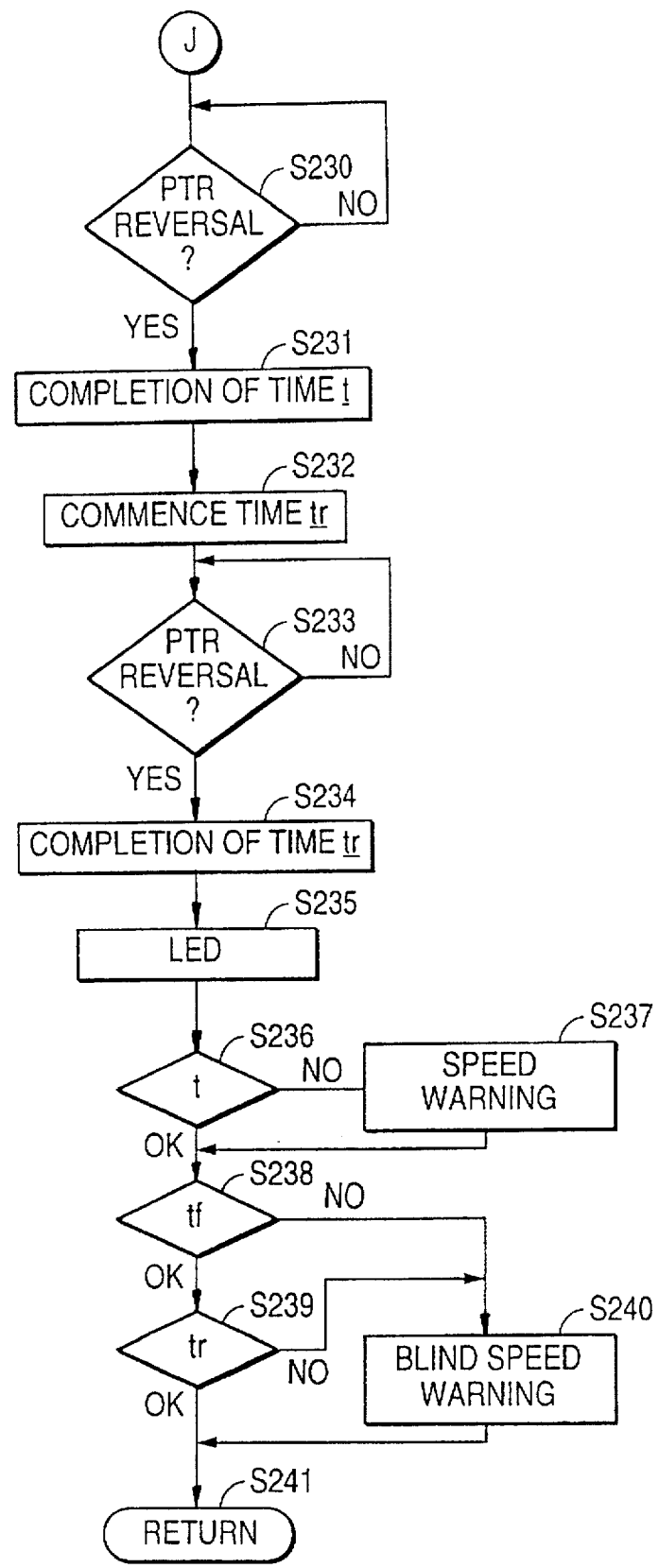
Figure 14A:
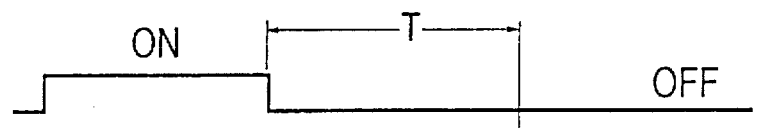
FIGS. 14(A), 14(B), 14(C) and 14(D) are timing charts illustrating the operation of a camera having a shutter instrumentation device according to an embodiment of the present invention.
Figure 14B:
Figure 14C:
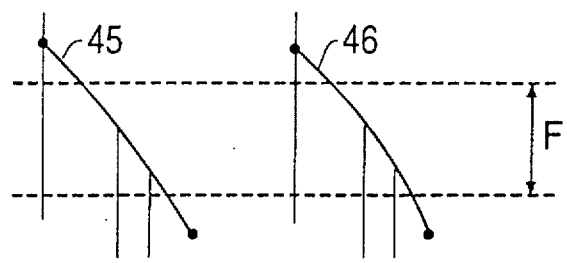
Figure 14D:
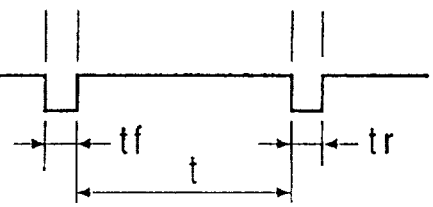

FIGS. 12 and 13 illustrate the shutter processing of step S108 in FIG. 11 in the present embodiment of the present invention.

Processing starts from step S200. In step S215, control time T (calculated in S101 of FIG. 11) is read from memory. In step S216, the current passing to the front blind magnet is ended (front blind magnet is set OFF), and the travel of front blind 15 is commenced. After this, processes beginning from step S217 and step S220 are simultaneously performed. To facilitate description in this embodiment, the case has been taken as an example in which the control time T is sufficiently longer than the respective shutter travel time.

In step S217, the timing of control time T is commenced. In step S218, the end of control time T is awaited. When control time T ends, the process moves to step S219 and the current passing to the rear blind magnet is ended (rear blind magnet is set OFF) and the travel of rear blind 16 is commenced.

In step S220, LED 18 is lit, simultaneously with step S217. In step S221, the reversal of the output of light receiving element 19 is awaited. Such reversal occurs on detection by detection mechanism 23 of slit forming shutter vane 20a included as part of front blind 15. When the output of light receiving element 19 reverses, processing moves to step S222 and timing is commenced of time tf. In addition, in step S223, the reversal of the output of light receiving element 19 due to the ending of the passage of shutter vane 20a of front blind 15 over detection mechanism 23 is awaited. Furthermore, in step S224, the timing of the measurement time t is commenced. In step S225, the timing of the measurement time tf is completed.

In step S230, after the ending of the processes of step S219 and step S225, the reversal of the output of light receiving element 19 is awaited. This reversal occurs when shutter vane 21a included as part of rear blind 16 begins to traverse detection mechanism 23. When the reversal occurs, the measurement of time t is completed in step S231 and, in step S232, the measurement time tr is commenced. Furthermore, in step S233, the reversal of the output of light receiving element 19 due to the ending of the passage of shutter vane 21a over detection mechanism 23 is awaited. When the reversal occurs, the timing of time tr is completed in step S234 and, in step S235, LED 18 is extinguished.

Next, in step S236, it is determined whether or not time t is within a predetermined tolerance time relative to control time T. If not (that is, when it is determined that there is a deviation from the tolerance time width), a speed warning is performed in step S237. In step S238, it is determined whether the travel time tf of front blind 15 is within a predetermined time width. In step S239, it is determined whether the travel time tr of rear blind 16 is within a predetermined time width. When steps S238 and S239 are negative (that is, the respective travel time tf or tr of front blind 15 or rear blind 16 deviate from the tolerance width), a blind speed warning to this effect is performed in step S240 and the process returns from step S241 to step S109 in FIG. 11.

By performing a blind speed warning, an indicator is lit on LCD 34 to notify the photographer that there is a deviation.

FIGS. 14(A), 14(B), 14(C) and 14(D) are timing charts showing the operation of front blind 15 and rear blind 16 and the corresponding output of light receiving element 19. More specifically, FIGS. 14(A), 14(B), 14(C) and 14(D) show the state of travel of front blind 15 and rear blind 16, changing due to the ON and OFF timing of the front blind and rear magnets, respectively.

When release button 10 is pressed, the current passing through the front blind magnet and rear blind magnet, respectively, becomes ON, and the electrical hold of each blind is commenced. Mechanical holding of front blind 15 and rear blind 16 is performed prior to the depression of release button 10. By pressing release button 10, mechanical holding is changed over to electrical holding by the front blind and rear blind magnets. After this changeover, stop 35 of the lens 2 is controlled, and the reflecting mirror (not illustrated) in the optical path is raised.

The front blind magnet is next set OFF. The front blind 15 thereby travels as shown by travel curve 45. Region F shows the vertical opening of aperture 6. Travel curve 45 describes a locus in region F. At this time, the slit forming shutter vane 20a of front blind 15 passes during its travel across the front surface of detection mechanism 23 and the output of light receiving element 19 reverses between the time tf. After this, the rear blind magnet is set OFF after control time T elapses (control time T is the predetermined exposure) and rear blind 16 traverses region F according to travel curve 46. At this time, the rear blind 16 passes across the front surface of detection mechanism 23. Time tr represents the time between reversals of the output of light receiving element 19.

Times tf and tr are obtained in the above manner. Once tf and tr are known, the true exposure time t can be determined. For example, when the true exposure time t actually obtained from light receiving element output differs from the predetermined time T, it can be determined that there was erroneous action in the mechanical shutter system. Furthermore, by measuring tf and tr, it is possible to determine the travel times of front blind 15 and rear blind 16, respectively. When the travel times tf and tr are longer than the standard value, it can be determined that the blind speed is slow. By contrast, when tf and tr are faster than the standard value, it can be determined that the blind speeds are excessively fast. Therefore, it is possible to determine the irregularity of the exposure.

Moreover, in a present embodiment of the present invention, detection mechanism 23 constituted by LED 18 and light receiving element 19 is located at a central portion of aperture 6. However, detection mechanism 23 may also be in plural positions such that it can detect the various shutter positions. With detection mechanism 23 positioned in plural locations, a "beginning state" of exposure and an "ending state" of exposure can be detected.

In the above embodiments of the present invention, warning detection is based on the measurement of a single exposure operation. However, warning detection can also be based on the measurement of multiple exposures.

In the above embodiments of the present invention, detection mechanism 23 comprises LED 18 and a light receiving element 19 (such as a photoresistor) and, therefore, detection by electrical control is possible. However, a detection mechanism operating by the detection of a change of an amount of static electricity may also be used.

In the above embodiments of the present invention, anomalies of the travel speed of shutter vanes are detected from a comparison of the actual exposure time to a control exposure time. If anomalies of operation of the shutter are detected, a warning signal is emitted. By emitting a warning signal, the anomaly of the shutter can be known at the time of photography.

The above embodiments of the present invention include a shutter mechanism which can open and close an aperture, and a light projection mechanism positioned facing the shutter mechanism which projects light towards the shutter mechanism. A light receiving mechanism is positioned on the same side of the shutter mechanism as the light projecting mechanism. The light receiving mechanism also faces the shutter mechanism and receives the light projected from the light projection mechanism and reflected from the shutter mechanism. In this manner, the light receiving mechanism detects the amount of reflected light. A shutter instrumentation mechanism measures, based on the amount of reflected light, the actual exposure time from when the shutter mechanism opens an aperture to the time when the shutter mechanism closes the aperture. A shutter vane state detection mechanism performs detection relating to the surface reflectivity of the shutter mechanism and outputs reflectivity information relating to this surface reflectivity. Change means changes a detection standard of the light receiving mechanism, based on the reflectivity information. The shutter vane state detection mechanism calculates the number of times of operation of the shutter mechanism and the sensitivity of the shutter instrumentation mechanism is automatically optimized. In this manner, the actual exposure time can be correctly measured with excellent accuracy.

The frequency of signals transmitted by LED 18 should be selected to be of a frequency which will not affect the film.

Although signals transmitted by LED 18 and received by light receiving element 19 are described as light signals, various types of signals along the electromagnetic spectrum can be transmitted and received. Appropriate transmitting and receiving elements for different types of signals are well-known.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera comprising:
   a shutter mechanism which opens and closes an aperture to expose film during photography, said shutter mechanism including a front blind having a shutter vane and a rear blind having a shutter vane;

a control unit which is electrically connected to the shutter mechanism, and which controls the movement of said shutter mechanism so that, to expose the film during photography, said front blind and said rear blind form a slit through cooperation between said shutter vane of said front blind and said shutter vane of said rear blind;

a speed calculation unit to calculate the travel speed of said shutter vane of said front blind and said shutter vane of said rear blind when the film is being exposed during photography;

a decision mechanism which is electrically connected to the speed calculation unit, and which determines whether or not the travel speed of said shutter vane of said front blind and said shutter vane of said rear blind calculated by said speed calculation unit is anomalous; and a warning mechanism which is electrically connected to the decision mechanism, and which emits a warning when said decision mechanism determines that the travel speed calculated by said speed calculation unit is anomalous.

2. A camera as in claim 1, wherein said control unit controls said shutter mechanism so that the film is exposed for a control time, and said camera further comprises:

a detection mechanism to detect the actual state of travel of said shutter vane of said front blind and said shutter vane of said rear blind when the film is being exposed during photography, by detecting the passage over the aperture by said shutter vane of said front blind and the passage over the aperture by said shutter vane of said rear blind; and an exposure time calculation unit for calculating the actual exposure time of the film based on the actual states of travel detected by said detection mechanism.

3. A camera as in claim 2, further comprising an exposure time decision mechanism to determine whether or not the actual exposure time calculated by said exposure time calculation unit is anomalous in relation to the control time.

4. A camera as in claim 3, further comprising a warning mechanism to emit a warning when said exposure time decision mechanism determines that the actual exposure time is anomalous.

5. A camera as in claim 2, wherein:

said detection mechanism detects the beginning of passage and the ending of passage over the aperture by said shutter vane of said front blind and the beginning of passage over the aperture by said shutter vane of said rear blind; and said exposure time calculation unit calculates the actual exposure time as a time from the ending of passage over the aperture of said shutter vane of said front blind until the beginning of passage over the aperture of said shutter vane of said rear blind.

6. A camera as in claim 5, further comprising an exposure time decision mechanism to determine whether or not the actual exposure time calculated by said exposure time calculation unit is anomalous in relation to the control time.

7. A camera as in claim 6, further comprising a warning mechanism to emit a warning when said exposure time decision mechanism determines that the actual exposure time is anomalous.

8. A camera as in claim 1, wherein:

said front blind includes at least one vane in addition to said shutter vane of said front blind, said at least one vane and said shutter vane each having a first end and a second end, where the second ends together form an edge of said front blind;

said rear blind includes at least one vane in addition to said shutter vane of said rear blind, said at least one vane and said shutter vane each having a first end and a second end, where the second ends together form an edge of said rear blind;

said shutter vane of said front blind is supported by a first linkage member coupled to the first end of said shutter vane of said front blind, and the second end of said shutter vane of said front blind extends further along the edge of said front blind than the second end of any vane of said at least one vane of said front blind; and said shutter vane of said rear blind is supported by a second linkage member coupled to the first end of said shutter vane of said rear blind, and the second end of said shutter vane of said rear blind extends further along the edge of said rear blind than the second end of any vane of said at least one vane of said rear blind.

9. A camera as in claim 8, further comprising:

a detection mechanism to detect the actual state of travel of said shutter vane of said front blind and said shutter vane of said rear blind, said detection mechanism being positioned so that the detection of the actual state of travel of said shutter vane of said front blind and said shutter vane of said rear blind is based on the detection of said second end of said shutter vane of said front blind and said second end of said shutter vane of said rear blind by said detection mechanism.

10. A camera comprising:

a shutter mechanism including a front blind having a shutter vane and a rear blind having a shutter vane, the shutter vane of said front blind and the shutter blind of said rear blind cooperating together during photography to form a slit while passing over an aperture, the slit allowing light to pass through the aperture to expose film during photography, and the shutter mechanism controlling the front blind and the rear blind to expose the film for a control time;

a detection mechanism which detects the actual state of travel of said shutter vane of said front blind and said shutter vane of said rear blind when the film is being exposed during photography, by detecting the passage over the aperture by said shutter vane of said front blind and the passage over the aperture by said shutter vane of said rear blind;

an exposure time calculation unit which is electrically connected to the detection mechanism, and which calculates an actual exposure time from the actual states of travel detected by said detection mechanism; and a warning mechanism which is electrically connected to the exposure time calculation unit, and which emits a warning when the actual exposure time calculated by said exposure time calculation unit is anomalous in relation to the control time.

11. A camera comprising:

a shutter mechanism which opens and closes an aperture to expose film, said shutter mechanism including a front blind having a shutter vane and a rear blind having a shutter vane;

a control unit which is electrically connected to the shutter mechanism, and which controls the movement of said shutter mechanism so that, to expose the film, said front blind and said rear blind form a slit through cooperation between said shutter vane of said front blind and said shutter vane of said rear blind; and a detection mechanism, which is fixed to the camera, to detect the actual state of travel of said shutter vane of said front blind and said shutter vane of said rear blind;

a speed calculation unit which is electrically connected to the detection mechanism, and which calculates the travel speed of said shutter vane of said front blind and said shutter vane of said rear blind in response to the actual state detected by the detection mechanism;

a decision mechanism which is electrically connected to the speed calculation unit, and which determines whether or not the travel speed of said shutter vane of said front blind and said shutter vane of said rear blind calculated by said speed calculation unit is anomalous; and a warning mechanism which is electrically connected to the decision mechanism, and which emits a warning when said decision mechanism determines that the travel speed calculated by said speed calculation unit is anomalous.

* * * * *